July 21, 1959 C. C. CLIFTON 2,895,160
DOLLY CASTERS
Filed March 23, 1956
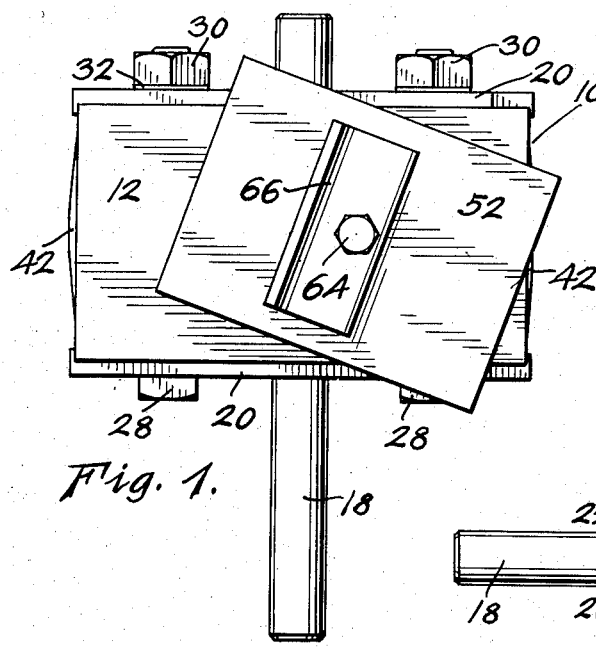
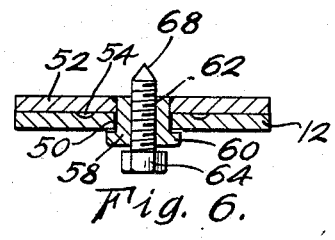
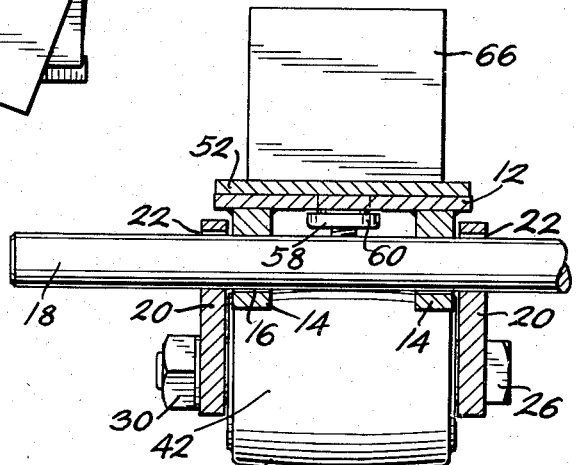
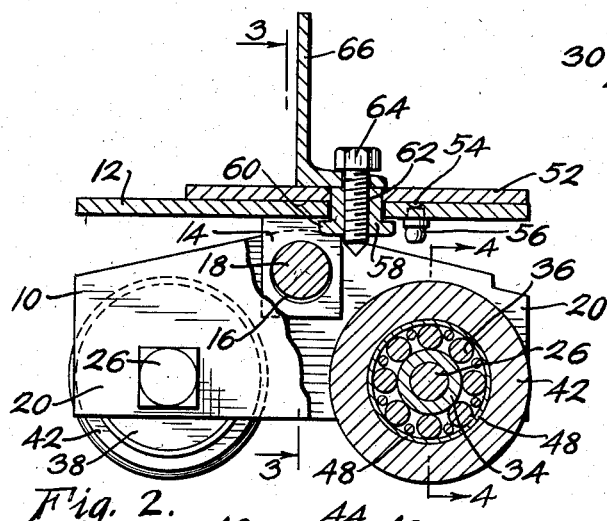
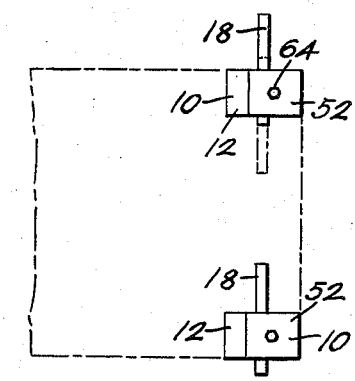
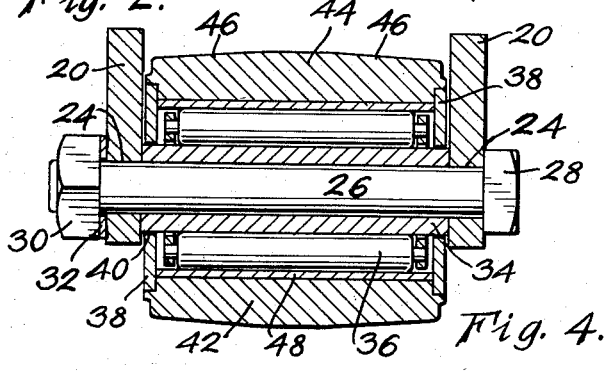
INVENTOR.
CHESTER C. CLIFTON
BY
ATTORNEY United States Patent Office 2,895,160
Patented July 21, 1959

2,895,160

DOLLY CASTERS

Chester C. Clifton, Denver, Colo., assignor to Acorn Company, Denver, Colo., a corporation of Colorado Application March 23, 1956, Serial No. 573,431

5 Claims. (Cl. 16—47)

This invention relates to casters; and more particularly, to dolly casters of the heavy duty type having supporting rollers mounted in tandem.

The movement of machinery and other equipment having a heavy weight concentration per unit area is a difficult and time-consuming task that generally requires specialized workmen and equipment. The ordinary heavy-duty caster is wholly unsuitable for this type of work by reason of the fact that the pivot or fulcrum by which the caster is attached to the article being moved is displaced horizontally from the point of wheel or roller contact with the ground, thus imparting a tremendous bending moment to the fulcrum which causes it to fail under heavy loads. Even a tandem-wheel caster in which the pivot or fulcrum does not lie between the wheels is subject to the same difficulties.

The conventional one-wheel casters cannot be used for heavy-duty work as the weight of the machine will cause the caster to pivot so as to move downhill. Alignment of the casters in the desired direction is very difficult to maintain and wobbling of the casters back and forth as the machine is moved over the supporting surface is quite common.

It has now been found in accordance with the present invention that a heavy-duty caster must have certain structural characteristics in order to be useful for the purpose intended.

The first of these is an axis of pivotation lying between the axes of rotation of the supporting rollers. Secondly, the tandem rollers must be mounted for tiltable movement about a substantially horizontal axis in order that the rollers will each remain in contact with the ground as they move over uneven surfaces. Mounting of the rollers on opposite sides of the pivot prevents wobbling of the caster and assures the fact that the caster will remain in line with the direction of desired movement. Thirdly, the supporting rollers must provide a relatively small area of contact with the supporting surface and yet transmit the load to a considerably greater area of the axle and related parts. Fourth, means must be provided between the supporting rollers for turning the caster about its pivot. Lastly, the means for turning the caster about its pivot should be mounted for longitudinal slidable movement relative to the caster so that in extended position it will provide a sufficient lever arm by which the caster may be turned easily; and, in retracted position will not interfere with movement of the machine by avoiding obstructions which would be in the path of the turning bar in the extended position.

It is, therefore, the principal object of the present invention to provide a dolly caster having the aforementioned structural characteristics.

The second object of the invention is to provide a dolly caster having means by which it may be attached to almost any kind of heavy equipment.

Additional objects of the invention are to provide a dolly caster which eliminates the need for specialized handling equipment; the need for personnel trained in moving heavy equipment; and, the necessity of several people to accomplish the move.

Further objects of the invention are to provide a dolly caster which can easily support loads of 100,000 lbs.; a caster which is small and compact; and, a caster which eliminates the need for skids, pipes, winches and cables.

Other objects will be in part apparent and in part pointed out specifically hereinafter in connection with the description of the drawing which follows, and in which:

Figure 1 is a top plan view of the dolly caster of the present invention;

Figure 2 is a side elevation thereof partly broken away and partly in section;

Figure 3 is a section taken along line 3—3 of Figure 2;

Figure 4 is a section taken along line 4—4 of Figure 2;

Figure 5 is a diagram illustrating the longitudinal slidable movement of the turning bar relative to the caster; and, Figure 6 is a section showing the manner in which the caster is attached to wooden skids and the like.

Referring now to the drawing wherein it will be seen that the caster of the present invention, indicated in a general way by numeral 10, is provided with a rectangular base plate 12 having downwardly projecting integral lugs 14 on opposite sides thereof at or near the transverse center line. The lugs are provided with aligned openings 16 adapted to receive turning bar 18 for longitudinal, slidable movement therein.

Two identical side plates 20 having turning bar openings 22 located in the upper center portion of the plates are mounted on the turning bar adjacent the outer face of lugs 14 for limited, tiltable movement relative to base plate 12. A pair of roller axle openings 24, shown in Figure 4, are provided in each side plate spaced forward and rearward of turning bar opening 22 and positioned along the lower edge of the side plates. The corresponding pairs of roller axle openings in the two plates are aligned to receive roller axles 26 therethrough. Each of the two roller axles is provided with a head 28 at one end and a nut 30 threadedly attached to the other end. A lock washer 32 is preferably positioned between the nut and the adjacent side plate, as shown. A sleeve 34, shown in Figures 2 and 4, is mounted on each of the roller axles and functions to maintain the side plates in spaced parallel relation. An elongated roller bearing 36 is carried on each of the sleeves for rotational movement and end plates 38 enclose the ends of each roller bearing. The sleeves function as the inner roller race for the bearing. The end plates are each provided with an opening 40 sized to receive sleeve 34. The roller bearing is provided with a conventional outer roller race 48 as shown. A roller 42 is mounted for rotation on the outer roller race of each of the roller bearings between the side plates.

It has been found in accordance with the present invention that the shape of the surface of rollers 42 is of utmost importance in the design of a heavy-duty dolly caster of the type herein described. It will be noted that each of the rollers is provided with a centrally located, relatively narrow cylindrical portion 44, shown most clearly in Figures 3 and 4, adjoined by inwardly tapering portions 46 on either side thereof. The relatively narrow cylindrical portion 44 at the center of the roller forms the ground contacting surface of ther oller; and yet, the weight of the load is distributed over the entire length of roller axle 26. The fact that neither of the rollers lies beneath the pivot point of the caster but are mounted in tandem on opposite sides thereof, means that both of the rollers must slide over the supporting surface when changing the direction of the caster. A conventional cylindrical roller is, therefore, unsuitable for this purpose because of the greater length of contact of the roller with the supporting surface which makes slidable movement exceedingly difficult under heavy loads. Two or more wheels mounted on the same axle present the same difficulty if all wheels are of the same diameter. If, however, three wheels are mounted on the same axle and the center wheel is larger than the other two, the direction of the caster may be shifted fairly easily; but, a much more serious problem arises in that the entire load is being carried by only one wheel and is being transmitted to a very small area of the axle. The use of elongated roller bearing 36 has also been found to effect a considerable improvement in the dolly caster of the present invention when compared to casters of similar design without a roller bearing.

In the preferred construction base plate 12 is provided with a pivot opening 50 shown in Figures 2 and 6, positioned on the longitudinal center line of the base plate but spaced slightly forward of the transverse center line thereof. It is important to note, however, that pivot opening 50 must be positioned somewhere between the axes of rotation of the rollers. Bearing plate 52 is mounted on top of base plate 12 with the adjacent flat surfaces thereof in slidable contact with one another. A grease groove 54, shown in Figure 2, is preferably milled in one of the plates and a grease fitting 56 is shown in communication therewith.

An internally threaded tubular pivot 58 is permanently attached to the underside of bearing plate 52 at or near the center thereof. The tubular pivot extends downwardly through pivot opening 50 in the base plate and is provided with an integral collar 60 to prevent separation of the plates. The threaded opening 62 in the tubular pivot receives bolt 64 by which the dolly caster of the present invention is attached to the underside of the article to be moved. When bearing plate 52 is attached to the article to be moved, the remaining portions of the dolly caster, including the base plate 12, may be rotated relative thereto through 360 degrees. Turning of the caster relative to the bearing plate is accomplished by means of turning bar 18. The turning bar performs a very valuable and important function in connection with the dolly caster of the present invention as it is the means by which the caster is positioned in the desired direction of movement. The cylindrical portion of the rollers and the spacing of the rollers on opposite sides of the pivot prevents the caster from accidentally pivoting about the pivot even though forces are applied to it in a direction other than the direction of desired movement which is contrary to the usual function of a caster. In this instance, however, it is extremely important that the caster continue to move in the direction in which it is pointed even though forces are applied in other directions.

When it is desired, however, to change the direction of movement of the casters, the turning bar 18 is moved into the full line position shown on the upper part of Figure 5. A sledge or like object is then used against the projecting portion of the turning bar to slide the rollers about the pivot and face the caster into the desired direction. Thus, the movement of the machine or other objects supported on the casters is fully controlled at all times which is extremely important in moving heavy loads to prevent injury to personnel and equipment. The turning bar may be moved longitudinally inward into the dotted line position of Figure 5 when moving through restricted openings. Mounting of the turning bar between the roller axles is also of utmost importance in turning the caster. In the preferred construction the axis of the turning bar is midway between the axes of rotation of the rollers.

The fact that the rollers and side plates are mounted on the turning bar for limited tiltable movement enables the caster to pass over uneven surfaces, up ramps and the like.

It is to be noted in connection with Figures 1 and 2, that the tubular pivot is positioned between the rollers so that no bending moment is imparted to it when supporting heavy loads. This feature is unique in caster construction and is the factor which enables a unit similar to that shown to support loads in the neighborhood of 100,000 lbs. without failure.

The dolly caster has been illustrated with angle iron 66 bolted to the bearing plate 52 by bolt 64. This angle iron enables the caster to be attached to vertical frame members and the like with a C-clamp. Of course, angle iron 66 is not used when the caster is attached to a horizontal surface as the horizontal surface is bolted directly to the bearing plate.

In Figure 6 it will be seen that the bolt 64 is provided with a pointed end 68. When the bolt is positioned as shown in Figure 6 with the pointed end uppermost the point will dig into the wood of skids and the like thus eliminating the necessity for other means of attachment.

From the foregoing description of the dolly caster of the present invention it will be seen that the many useful objects for which it was designed have been achieved; and, therefore, I claim:

1. A heavy-duty dolly caster comprising: a substantially horizontal bearing plate provided with means for effecting attachment to the underside of an article to be moved; a base plate attached to the underside of the bearing plate in face-to-face relation for relative rotational movement about a common pivot; substantially vertical lugs attached to the underside of the base plate in spaced relation on opposite sides of the common pivot and containing horizontally aligned openings for the reception of a turning bar; a turning bar mounted within the openings in the lugs, a portion of said turning bar projecting outwardly beyond the lug on at least one side to form a lever arm; substantially vertical side plates mounted on the turning bar in spaced substantially parallel relation for tiltable movement relative to the base plate, the side plates having a plurality of horizontally aligned pairs of openings spaced forwardly and rearwardly of the turning bar and common pivot connecting the base plate and bearing plate for the reception of roller axles; roller axles mounted in and extending between the aligned openings in the side plates; bearing means mounted for rotation on the roller axles; and, rollers mounted for rotation on said bearing means, the projecting lever arm portion of the turning bar forming means for effecting relative rotational movement between the bearing plate and remaining elements of the caster by applying equal moments on opposite sides of the common pivot whereby the rollers may be skidded over a supporting surface to face the caster in a new direction when in loaded condition.

2. A device in accordance with claim 1 in which the turning bar is mounted for longitudinal slidable movement within the openings in the lugs so that the projecting portion thereof may be moved inwardly to avoid obstructions which would be in the path of said bar when extended.

3. In a dolly caster of the type having supporting wheel means mounted in tandem with their axes of rotation in spaced parallel relation on opposite sides of the pivot axis of the caster, the improved means for turning the caster about its pivot axis which comprises: a turning bar attached to the caster between the axes of rotation of the wheel means at spaced points on opposite sides of the pivot axis of the caster with its axis substantially parallel to said axes of rotation of the wheel means, said turning bar projecting outwardly from the caster to form a lever arm by which the wheel means may be skidded arcuately over a supporting surface about the pivot axis to change the direction of movement of the caster when in loaded condition.

4. A heavy-duty dolly caster comprising: a substantially horizontal bearing plate provided with means for effecting attachment to the underside of an article to be moved; a base plate attached to the underside of the bearing plate in face-to-face relation for relative rotational movement about a common substantially vertical pivot axis; substantially vertical side plates attached in spaced parallel relation to the base plate for tiltable movement relative thereto about a common substantially horizontal pivot axis, said axis comprising a turning bar carried by the underside of the bearing plate, said turning bar having a portion thereof projecting beyond the side of the caster to provide a lever arm positioned to apply an equal moment on opposite sides of the vertical pivot axis; roller axles mounted between the side plates in spaced parallel relation on opposite sides of both the horizontal and vertical pivot axes, tandem supporting rollers mounted on the roller axles, each of said rollers having a relatively narrow cylindrical central portion forming the principal ground-contacting surface and two inwardly tapering portions on either side thereof, the cylindrical portion forming means by which the rollers may be skidded arcuately over the ground about the vertical pivot axis by means of the lever arm of said turning bar forming the horizontal pivot axis, to change the direction of the caster when under load while transmitting the load carried thereby along the entire length of the roller axles.

5. A device in accordance with claim 4 in which: the turning bar is mounted for longitudinal slidable movement relative to the caster whereby it may be moved inwardly to avoid obstructions which would be in the path of said bar when extended.

References Cited in the file of this patent

UNITED STATES PATENTS

| | | |
|---|---|---|
| 1,435,371 | Bartlett et al. | Nov. 14, 1922 |
| 1,479,091 | Slonecker | Jan. 1, 1924 |
| 1,920,004 | Currie | July 25, 1933 |
| 2,347,947 | Hamilton | May 2, 1944 |
| 2,713,179 | Clifton | July 19, 1955 |

FOREIGN PATENTS

| | | |
|---|---|---|
| 415,215 | Great Britain | Aug. 23, 1934 |